United States Patent [19]

Parker et al.

[11] 3,929,588
[45] Dec. 30, 1975

[54] METHOD OF AND APPARATUS FOR DETERMINING THE OXYGEN CONTENT OF BLOOD

[75] Inventors: Frederick A. Parker, Broomall; William R. Mac Bride, King of Prussa, both of Pa.

[73] Assignee: Biomarine Industries, Inc., Devon, Pa.

[22] Filed: Aug. 3, 1973

[21] Appl. No.: 385,388

[52] U.S. Cl............................. 204/1 T; 204/195 P
[51] Int. Cl.²......................................... G01N 27/46
[58] Field of Search........................ 204/1 T, 195 P

[56] References Cited
UNITED STATES PATENTS

| | | | |
|---|---|---|---|
| 3,272,725 | 9/1966 | Garst | 204/1 T |
| 3,528,904 | 9/1970 | Cliffgard | 204/195 P |
| 3,678,375 | 7/1972 | McFarland et al. | 204/195 P |
| 3,685,346 | 8/1972 | Molloy | 204/195 P |
| 3,694,734 | 9/1972 | Blackmer | 204/195 P |
| 3,711,395 | 1/1973 | Plank et al. | 204/195 P |

*Primary Examiner*—T. Tung
*Attorney, Agent, or Firm*—Browne, Beveridge, Degrandi & Kline

[57] ABSTRACT

A method of and an apparatus for quickly and reliably analyzing fresh blood to accurately determine its partial oxygen pressure ($pO_2$) with the analysis being displayed as a digital readout on a lighted panel when completed. Blood is deposited directly onto the oxygen permeable membrane of an oxygen sensor, preferably of the galvanic cell-type containing a gold cathode and a lead anode in a basic electrolyte. The sensor measures the transfer of oxygen molecules from the bottom layers of blood through the membrane into the sensor and transmits this information to a small portable computer which calculates the $pO_2$. The computer converts the sensor output signal to a digital voltage and displays the signal as a digital readout on a lighted display panel for easy and direct reading.

16 Claims, 6 Drawing Figures

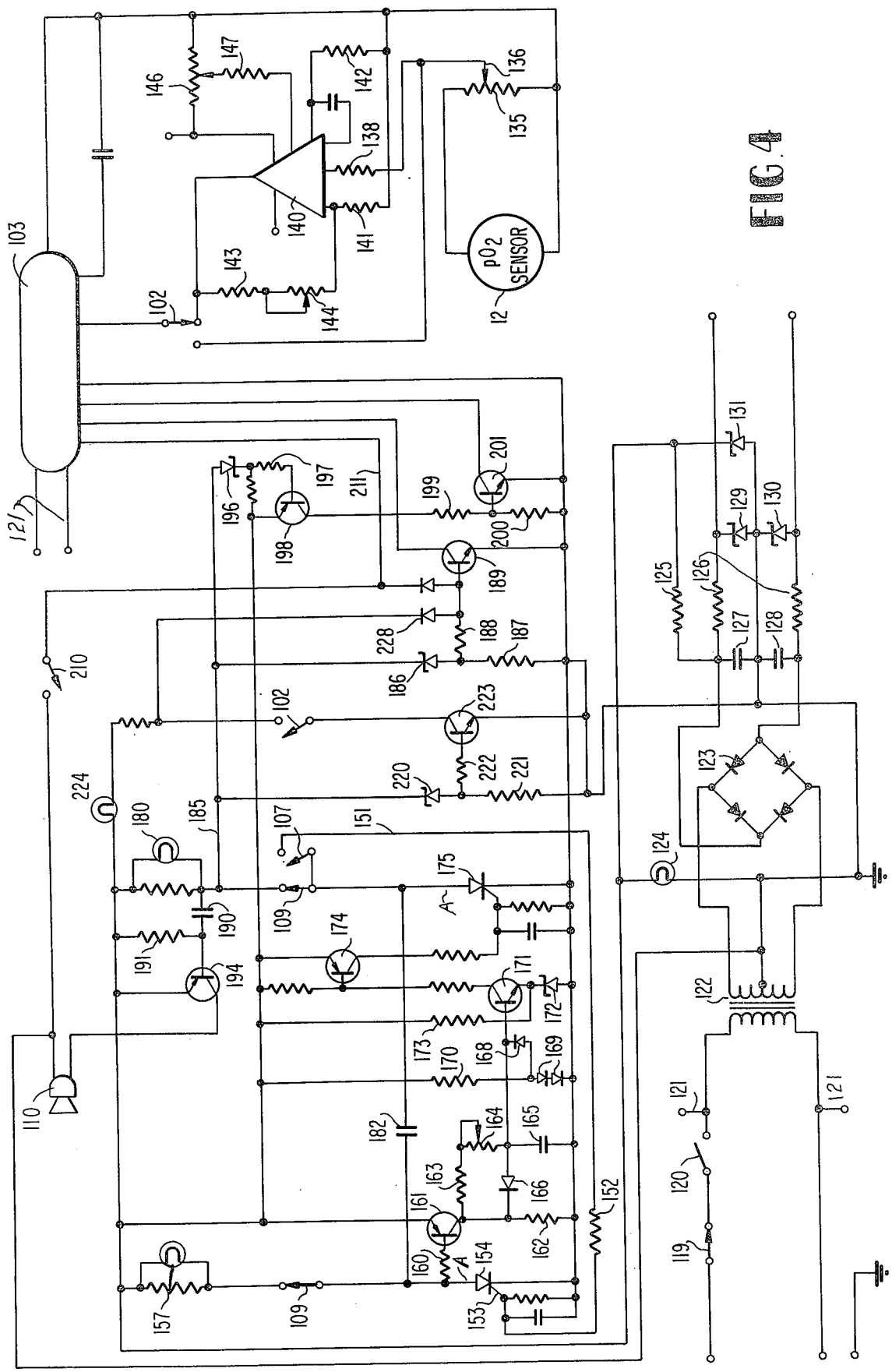

METHOD OF AND APPARATUS FOR DETERMINING THE OXYGEN CONTENT OF BLOOD

BACKGROUND OF THE INVENTION

1. Field of the Invention

This invention relates to blood oxygen analysis and more particularly to an improved method for quickly and accurately determining the $pO_2$ of fresh blood in the patient environment, and to an improved, inexpensive, portable apparatus for use in carrying out the process.

2. Description of the Prior Art

In the practice of modern medicine, it is frequently necessary or desirable to determine the $pO_2$ of a patient's blood either for diagonostic or treatment purposes. For example, impaired gas exchange of the lungs, either from pulmonary or non-pulmonary causes, may cause hypoxemia which can present an urgent and life threatening situation requiring immediate remedial measures. In such a situation, the rapid and accurate identification of the condition by determining the $pO_2$ of the patient's blood is essential to enable the attending physician to initiate timely procedures to correct the condition. Numerous other, if less dramatic, needs for very quickly obtaining this vital information are well-known to the clinician.

While there now exists a variety of known devices for the determination of $pO_2$, as well as $pCO_2$ and pH indications, these prior art devices have generally been highly sophisticated and costly instruments requiring permanent installations frequenty involving complex plumbing and wiring systems as in a laboratory facility. As a result, the utility of these prior art devices has frequently been limited due to their inaccessibility and/or delays in receiving results. Further, these prior art devices have generally required great care in the preparation and handling of the blood samples, normally requiring the attention of a highly trained technician to operate them.

Blood oxygen analyzing systems normally employ an electrochemical sensing cell of the galvanic type illustrated, for example, in U.S. Pat. No. 3,711,395 assigned to the assignee of the present application, or of the polarographic cell type illustrated, for example, in U.S. Pat. No. 3,574,087. These devices conventionally employ a cathode and an anode in an electrolyte solution encased in a cell formed from an insulating material, such as a thermoplastic polymeric material. The cathode is positioned adjacent an opening in the cell wall, and an oxygen permeable membrane is tautly stretched across the opening in closely spaced relation to or in direct contact with the surface of the membrane so that oxygen permeating the membrane immediately produces the desired electrochemical reaction, which reaction is directly related to the amount of oxygen entering the electrolyte solution in the cell.

It is well known that, when fresh blood is exposed to air, oxygen from the air will be absorbed into the blood (or lost to the air should the blood $pO_2$ be higher than the ambient $pO_2$). For this reason, it has generally been considered essential to the accurate determination of the $pO_2$ that the blood sample be maintained in an anaerobic condition, i.e., not exposed to oxygen-containing air, from the time it is drawn from the patient until after completion of the analysis. Similarly, the temperature of the blood is known to have a direct relation upon the indicated $pO_2$ obtained from the prior art blood oxygen analyzers, and for this reason care has generally been taken to maintain the blood sample at body temperature during analysis, or alternatively to carefully record the actual temperature of the blood sample during analysis and correct the results accordingly.

Since molecular oxygen passes directly from solution in the blood through the membrane of an electrochemical analysis cell, there is a tendency for the molecular oxygen in solution to become depleted from the layers of a stationary sample of blood immediately adjacent the cell membrane. For this reason, the prior art blood oxygen analyzers have sometimes had provisions for agitating the blood sample on the membrane, or for continuously flowing the blood to continuously replace the layers immediately adjacent the membrane.

While the commercially available blood oxygen analyzers have generally been accurate and capable of providing an indication of the $pO_2$ of a sample in the lab in a relatively short time, there nevertheless has existed a need for a reliable, portable device for providing accurate on-the-spot arterial or venous $pO_2$ in the patient environment, thereby eliminating the inherent delays in the use of permanently fixed laboratory facilities. It is, therefore, an object of the present invention to provide such a device which is both low in cost and simple to use.

Another object of the invention is to provide an improved method of obtaining a rapid and accurate determination of the $pO_2$ of a blood sample without requiring agitation or temperature control of the blood sample.

Another object of the invention is to provide an improved blood oxygen analyzer which may be calibrated in room air without the use of precision instruments and gauges and which does not require the attention of a highly skilled technician.

Another object of the invention is to provide such a device which will provide an accurate $pO_2$ with the blood sample exposed to the open atmosphere during analysis.

SUMMARY OF THE INVENTION

In the attainment of the foregoing and other objects, an important feature of the invention resides in providing a galvanic-type electrochemical cell having a reservoir on the top surface thereof to receive a sample of fresh blood directly onto the membrane. The galvanic cell is connected to a small, light-weight computer including a signal conditioning and analyzing circuit and a calibration circuit for standardizing the signal passed through the remaining circuitry against a reference, namely air, which contains approximately 20.9% oxygen.

After the unit has been calibrated in room air, the blood sample to be tested is deposited directly onto the face of the sensor membrane and a time delay circuit, conveniently set for about 90 seconds delay, is energized. At the end of the delay time, a signal is applied enabling the output from the sensor circuit to be applied directly to a digital display, and this signal remains displayed on a lighted panel, with the display number stored therein until the circuit is reset. After recording the initial reading, the sensor membrane may be cleaned and the circuit reset for another reading.

It has been found that, despite the fact that the sample pool of blood on the sensor membrane remains stationary, and the oxygen in solution in the blood is passed from the layers adjacent to the membrane, a predictable gradient is established, the principal factors affecting this gradient being the rate $O_2$ is consumed at the cell, the diffusion rate of $O_2$ within the blood and the rate at which hemoglobin gives up oxygen to solution. Further, since the sensing unit is calibrated at room temperature, and since the sensing unit, per se, constitutes a relatively large heat sink, the temperature of the blood at the surface of the membrane is quickly equilized with respect to the sensor so that accurate readings are obtained from blood samples ranging in temperature from ambient or room temperature to body temperature, thereby eliminating any necessity for maintaining the blood sample at a uniform temperature as the $pO_2$ correction factor for blood, at the measured temperature of the sensing unit with respect to normal body temperature of 37C is well-known.

By providing a fixed time delay which is sufficient to permit the passage into the sensing cell of oxygen which was originally contained within the membrane itself and to establish a gradient from the blood sample to the cathode, an accurate reading of the oxygen in solution in the blood can readily and quickly be determined. Thus, with the unit calibrated and the sensor membrane clean, a reliable and accurate $pO_2$ reading can be obtained in just slightly more than 90 seconds after the blood sample is drawn from the patient, thereby providing an invaluable tool in innumerable hospital, clinical and emergency situations regardless of the location of the patient.

BRIEF DESCRIPTION OF THE DRAWINGS

Other objects and advantages of the present invention will become apparent from the following detailed description, taken in conjunction with the drawings, in which:

FIG. 4 is a detailed wiring diagram of the apparatus;

DESCRIPTION OF THE PREFERRED EMBODIMENT

Figure 1:
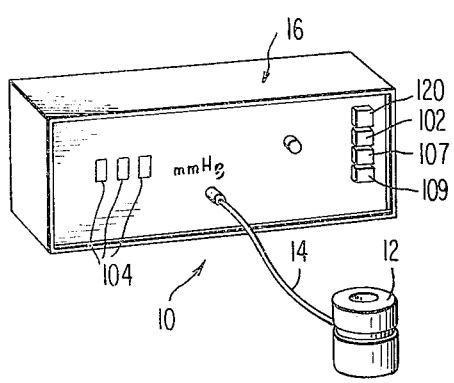
FIG. 1 is a perspective view of the blood oxygen analyzing apparatus according to the present invention.

Referring now to the drawings in detail, an apparatus according to the present invention is designated generally by the reference numeral 10 and illustrated in FIG. 1 as embodying a galvanic-type oxygen sensing device 12 connected, through suitable conductors 14, to a small portable computer or electric analyzer designated generally by the reference numeral 16.

Figure 2:
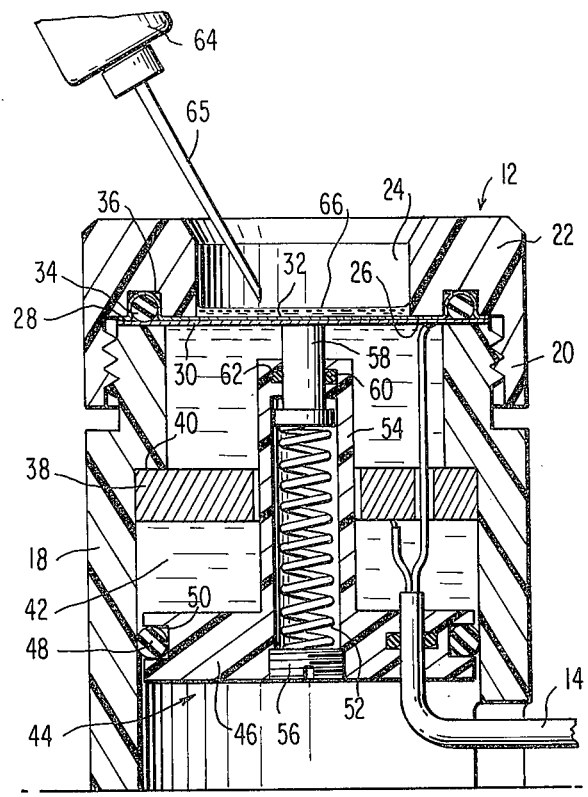
FIG. 2 is an enlarged sectional view, in elevation, of an electrochemical sensing cell of the galvanic type employed in the apparatus.

Referring specifically to FIG. 2, it is seen that the sensor 12 is made up of a generally cylindrical hollow body 18 having an open bottom end and external threads formed around its outer periphery adjacent its upper end for threadably engaging female threads on the flange 20 of a cap member 22. The cap 22 has an annular bore 24 extending axially therethrough, with the internal diameter of the bore being less than the internal diameter of the threaded end of the cylindrical body 18, thereby providing a shoulder 26 overlying the flat end 28 of the cylindrical body 18 when the two elements are threaded together. Prior to assembly of the body 18 and cap 22, a thin, disc-shaped gold electrode is positioned on the end 28 of cylinder 18. Also, a thin, oxygen permeable membrane 32 of the type well-known in the art is stretched tautly over the inner end of bore 24 and is retained in place by an O-ring 34 pressed into a groove 36. Upon threading the closure 22 onto the body 18, the membrane and O-ring tightly clamp the peripheral edge of the gold electrode 30 onto the end of the cylindrical body 18 to form a fluid-tight seal, with the inner surface of the membrane in surface-to-surface contact with the outwardly directed surface of the gold electrode. Electrode 30 has a plurality of small perforations (not shown) formed therein in the central portion thereof within the area defined by bore 24.

Mounted within the hollow interior of body 18 is a second electrode 38 preferably formed from lead wool pressed into an annular ring adapted to fit within the body 18 and be retained in spaced relation to the gold electrode 30 by a shoulder 40.

The hollow interior of the body 18 is filled with an electrolyte solution 42 which is retained by a piston-type sealing assembly 44. This assembly includes an annular disc portion 46 adapted to be telescopingly received into the body 18, and an O-ring 48 positioned within an O-ring groove 50 maintains a fluid-tight seal between the element 46 and the interior surface of the hollow body 18.

The sealing assembly 46 is resiliently urged away from the gold electrode 30 by a coil spring 52 mounted within the hollow interior of an inwardly projecting tubular portion 54 integrally formed on the inner surface of the disc-shaped portion 46. Spring 52 is retained in position by a threaded plug 56 and resiliently urges a piston 58 into contact with the central inwardly facing portion of the gold electrode 30, thereby continuously urging the gold electrode outwardly into a slightly outwardly convex position, thereby maintaining continuous surface-to-surface contact between the gold electrode 30 and the oxygen permeable membrane 32. An O-ring 60 positioned within an O-ring groove 62 maintains a fluid-tight seal between the piston 58 and the stem 54.

The action of the coil spring 52 continuously urging the piston-type sealing assembly away from the gold electrode maintains a continuous slightly negative pressure within the electrolyte solution 42. This negative pressure, acting through the conventional perforations (not shown) in the gold electrode 30 provides a pressure differential across the flexible membrane, thereby further assuring continuous surface-to-surface contact between the gold electrode and the membrane. This continuous contact assures accurate, uniform readings from the apparatus as all oxygen passing through the membrane is immediately reduced on the surface of the gold electrode to produce an electrical signal which signal is, of course, proportional to the amount of oxygen passing through the membrane. The electrical signal is carried from the electrodes by the cable 14 which passes through an opening in the disc member 46 and includes a conductor connected to each of the electrodes 30 and 38.

Still referring to FIG. 2, when a blood sample is drawn from a patient with a conventional hypodermic syringe indicated generally by the reference numeral 64, and after the apparatus has been calibrated in the manner described more fully herein below, the conventional needle is removed from the needle support nipple 65 of the syringe to avoid inadvertent puncture of the thin membrane 32. A sample of approximately 0.3 to 0.5 cc. of blood is then deposited directly onto the surface of the membrane covering the area thereof within the bore 24. Removal of the needle also permits discharge of the blood sample in a larger stream, thereby avoiding unnecessary aeration of the blood.

Since the surface of the pool of blood 66 is continuously exposed to air, oxygen is continuously absorbed into the surface of the blood (or lost to the air should the blood $pO_2$ exceed the ambient $pO_2$). However, as is well-known, the hemoglobin in the blood quickly combines with molecular oxygen as the oxygen in solution increases, up to the level of saturation, acting as an oxygen sink. This provides a delay in the diffusion rate of oxygen into the blood and minimizes the effect of the ambient $pO_2$ on the $pO_2$ level at the membrane/blood interface, where the measurement is being made. Applicant has found therefor, that it is not necessary to keep the sample blood in the pool on the membrane in an anaerobic condition during the testing period since the oxygen from the air does not have time to penetrate through the thickness of the stationary sample to effect the oxygen in solution in the layers of blood immediately adjacent to the surface of the membrane. This has been proven by making comparative tests in which the surface was exposed to pure oxygen as well as to pure nitrogen, with the results in both cases being substantially identical.

As the oxygen leaves solution in the blood and passes through the membrane, a gradient is established in the layers of blood adjacent the membrane. Some time delay is, of course, required before taking a reading in order for the oxygen previously in the membrane to permeate the membrane and to establish a continuous gradient through the membrane and into the blood sample. The thickness and permeability of the membrane will also effect a gradient from the sample to the electrode (through the membrane) but this gradient will be constant in any oxygen sensor and can be compensated for by calibration of the unit in ambient air.

Applicant has found that it is possible to correlate the blood oxygen level measured after a fixed time back to the oxygen level at the time the original sample was placed onto the membrane. Thus, by establishing a time delay which is sufficient to permit oxygen originally in the membrane to pass therethrough and to establish the gradient in the lower levels of the blood, and by measuring the oxygen in solution at this fixed lapsed time, the apparatus can readily be calibrated to convert this instantaneous reading back to the $pO_2$ at the time of depositing the sample onto the instrument.

Since the size of the blood sample is relatively small (normally 0.3 to 0.5 cc.) in comparison to the mass of the oxygen sensor, including the electrolyte solution contained therein, and since the unit is calibrated at ambient temperature in the manner described hereinbelow, the temperature of the blood sample will normally readily come to a temperature which approximates the temperature of the sensing device, which temperature, if desired, may be easily measured by a thermistor (not shown). Within limits ranging from normal room temperature to body temperature, it has been found that the temperature of the sample does not materially affect the reading as various temperature effects tend to be compensatory. However, if desired, some temperature compensation can be made for maximum accuracy. Further, even with use of this relatively small blood sample, an accurate reading can be established before oxygen absorbed from the air penetrates the sample to the depth even approaching the membrane so that it is not necessary to maintain the sample in an anaerobic condition. Since the blood sample is deposited directly upon the membrane, without any preparations required other than calibration of the apparatus, it follows that succeeding samples may be immediately tested simply by cleaning the surface of the membrane as by rinsing the old sample therefrom in a suitable cleansing solution, and depositing the second sample directly onto the membrane.

Figure 3:
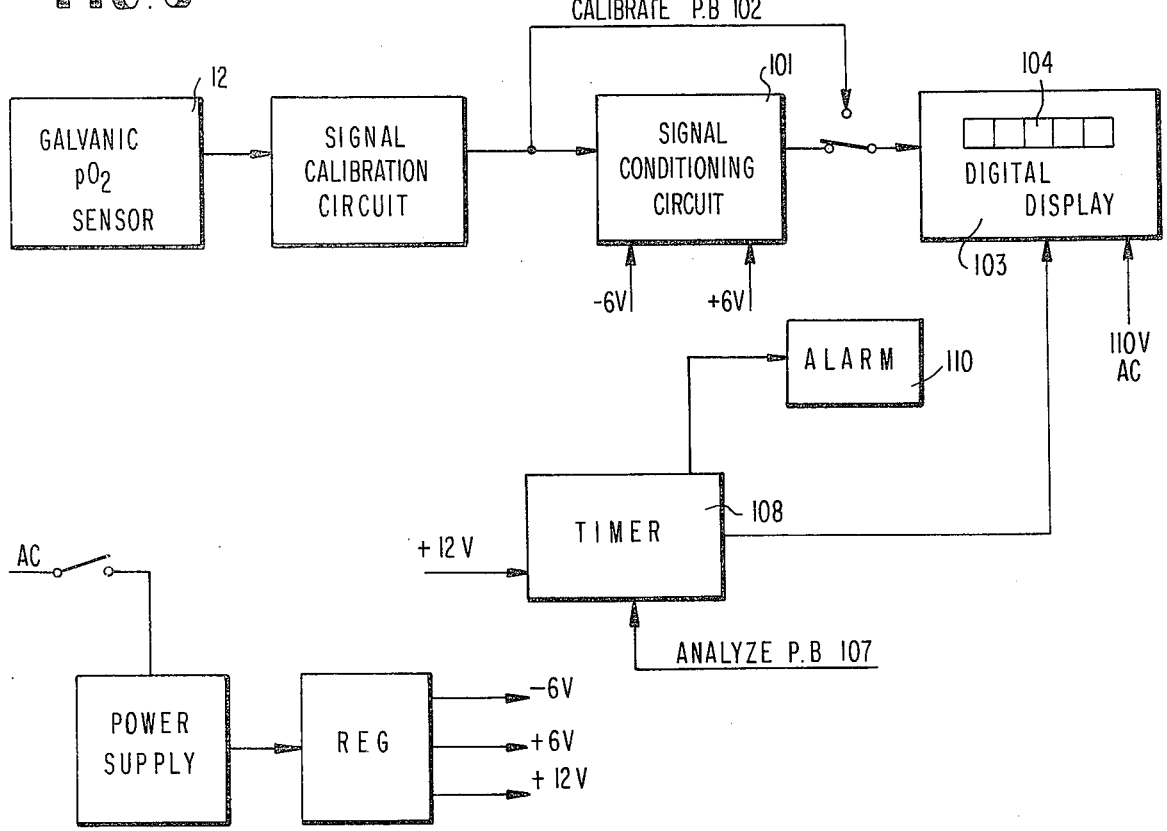
FIG. 3 is a block diagram illustrating the electrical circuit of the apparatus.

Referring now to FIGS. 3 and 4 of the drawings, the operation of the apparatus in converting the electrical signal from the sensor to a readily visible display indicating the actual $pO_2$ will be described in detail.

As shown in the block diagram of FIG. 3, the output signal voltage from the oxygen sensor 12 is applied to the signal calibration circuit then either directly to the digital display 104, or to the display via the signal conditioning circuit depending upon the position of push button switch 102. Switch 102 when positioned to bypass the signal conditioning circuit provides a method of standardizing the signal against a reference, namely air, which normally contains 20.9% oxygen. Thus, for calibration purposes, with the membrane 32 exposed to ambient air, the oxygen sensor output voltage is applied through calibration switch 102 to a digital volt meter 103 which converts the voltage output signal from oxygen sensor 12 to a digital voltage and displays same as a digital readout on the digital display 104 of digital volt meter 103. The digital display 104, which is normally OFF, lights up displaying the number when push button switch 102 is depressed. The front panel has a calibration knob connected to wiper 136 of potentiometer 135 which is adjusted until the $pO_2$ of the ambient air is displayed on digital display 104. The "calibrate button" 102 is released and its display goes off and the unit is then calibrated to analyze blood. It will be appreciated that instead of digital display 104 the display may be a conventional analog display of a meter deflection or any other form of a display. For example, in addition to display 104, or as an alternative, the signal may be printed by a standard digital printer (not shown) for purposes of providing a permanent record of the reading. Moreover, the signal, may be applied directly to a computer for analysis or diagnostic purposes if so desired. Thus, the digital volt meter 103 constitutes a utilization device as well as a display instrument.

After calibration the unit is ready to analyze blood. A sample of blood is obtained from a patient as described earlier herein and this sample is uniformly applied to the exposed face of the oxygen permeable membrane of sensor 12 in the manner illustrated in FIG. 2. The operator then pushes the "Analyze" Push Button 107 (shown in greater detail in FIG. 4). Timer 108 then marks a predetermined period of time, preferably about 90 seconds. At the end of this time, a signal is applied from the timer 108 to digital volt meter 103 thereby permitting the output from conditioner analyzer 101 to be applied through calibration switch 102 to the digital display volt meter 103. The display 104 lights up and provides an indication of the oxygen partial pressure of the patient's blood in milimeters of mercury. In addition, the timer provides a signal to an audible alarm 110 which is activated to notify the operator that the analyze period is over. The display 104 will remain lit with the display number stored therein until the reset button is depressed. In the embodiment illustrated, after the operator records the reading, sensor 12 is cleaned by washing the blood sample 66 from membrane 32 with a water solution of Potassium hydroxide, and the reset button 109 is depressed. This readies the instrument for the next reading.

The sensor signal is applied from the oxygen sensor 12 to a calibrate potentiometer 135, then to the signal conditioning circuit 101; the details of the signal conditioning circuit 101 to be described in detail in connection with the circuit schematic thereof. However, it should be noted that the signal conditioning circuit 101 contains an operational amplifier where the gain and offset are added proportional to the transfer function difference between air and blood. In other words, the transfer of oxygen molecules through the oxygen permeable membrane is dependent upon many factors, including the rate of depletion of oxygen from the surface of the liquid adjacent to the membrane. That is, the transfer of oxygen molecules through the blood/membrane interface zone is taken into account in accordance with the present invention. This relation is hereinafter sometimes referred to as the time transfer function.

Referring now to the detail schematic of the blood gas analyzer of the present invention, 110 volts alternating current power from a conventional supply is brought through a fuse 119 and an ON-OFF switch 120, and is applied first to a pair of leads 121 to volt meter 103 for normal operation thereof, volt meter 103 being a conventional digital volt meter which converts an analog signal voltage on the input thereof to a digital signal which is displayed on display screen 104 shown in FIGS. 1 and 3. In addition, the A.C. voltage is applied to a step-down transformer 122 which applies this A.C. voltage to bridge rectifier 123. A small lamp 124 indicates that power is on. A conventional voltage dropping and filter arrangement is constituted by resistors 125, 126 and capacitors 127 and 128. The filtered voltage is applied through a conventional set of zener diodes 129, 130 and 131 to provide a regulated +6 volt and a regulated −6 volt as well as a regulated +12 volt. The two 6- -volt supplies are applied to the signal conditioning circuit 101 and the +12 volt is used to supply power to the timer, audible alarm and front panel push button switch indicator lights, e.g., "analyzer", "calibrate" etc.

Zener diode 220 and resistor 221 are connected to the 12 volt supply through the reset lamp to provide a signal via resistor 222 to the base of transistor 223. Thus, when calibrate switch 102 is closed, calibrate lamp 224 is energized, and in addition, a signal via diode 228 is applied to the base of transistor 189 to permit the digital display to be illuminated.

The output voltage from sensor 12 is applied to calibrate potentiometer 135, and the voltage on wiper 136 thereof is applied as one input to calibrate switch 102. In addition, the signal is applied to resistor 138 which applies the signal to the input terminal of operational amplifier 140. A second input to the operational amplifier is constituted by the negative terminal or pole of the oxygen sensor 12 via resistors 141. The output terminal of the operational amplifier has a variable feedback path constituted by resistors 143 and 144 which adjusts the gain of the amplifier in proportion to the transfer function difference between air and blood. In addition, offset is provided by a voltage developed across resistor 146 and series resistor 147. The signal from the conditioning-analyzer circuit 101 is also applied to calibrate switch 102 which is shown in its normal condition. That is, the switch is spring loaded so that, the signal from the oxygen sensor 12, after being adjusted via potentiometer 135 for a standard oxygen level, is applied only momentarily to the digital volt meter for calibration purposes.

Analyze push button switch 107 applies a voltage, via lead 151 and resistor 152 to the gate circuit 153 of silicon controlled rectifier 154 (SCR) which has a conventional resistor-capacitor filter on the gate electrode 153. The anode A of the SCR 154 is connected through recycle switch 109 and lamp circuit 157 to the 12 volt supply so that the SCR 154 latches on or turns on. This lights lamp 157 which is under the "analyze" push button switch 107.

In addition, a signal on the SCR 154 is applied through base resistor 160 of transistor 161. The emitter of transistor 161 is connected to the 12 volt supply whereas the collector is connected through collector resistor 162 to the ground or common. The output of transistor 161 is applied to fixed resistor 163 and a variable resistor 164 and timing capacitor 165. Capacitor 165 and resistors 163–164 form a long time constant RC timing circuit with the time periods thereof being adjusted by the wiper on potentiometer 164. Diode 166 provides a bypass for resistors 163 and 164 and provides for discharging of capacitor 165. Diodes 168 and diode pair 169 along with resistor 170 provide a bias for compacitor 165. Transistor 171 has its emitter electrode connected to a zener diode 172 and a voltage divider resistor 173. Resistor 173 and zener 172 assures that when capacitor 165 reaches a voltage of approximately 6.5 volts, transistor 171 will turn on. Transistor 171 has its collector resistance split so that the intermediate point of these resistors can provide an output signal which is connected to the base of transistor 174. When transistor 171 turns on, transistor 174 is likewise turned on.

The output signal from transistor 174 is used as a gate signal for silicon controlled rectifier 175. SCR 175 turns on and energizes lamp 180 which is under the recycle switch button 109. In addition, SCR 175 supplies a pulse through capacitor 182 to the anode of SCR 154 which pulse is sufficient to turn off SCR 154. SCR 175 also provides a signal on lead 185 which is applied through zener diode 186 and resistor 187 as an input signal to the base resistor 188 of transistor 189. Transistor 189 is normally on and this signal on the base thereof turns off transistor 189. In addition, the signal from SCR 175 is applied through a capacitor 190 to the base of transistor 194 which is connected to energize the alarm 110.

When transistor 189 is turned off, the digital volt meter 103 is turned on or illuminated. Moreover, SCR 175 applies a signal by way of zener diode 196 to a resistor 197 to the base of transistor 198 thereby turning on this transistor which, through its collector resistors 199 and 200, provides a signal to the base of transistor 201. Transistor 201 applies a signal which "freezes" the digital volt meter display. That is, the output from transistor 201 provides a hold or store signal to the digital volt meter so that any signal appearing thereon at that time instant is locked or stored, as in a memory, in the digital volt meter 103.

Recycle button 109 disables SCR 175 and resets same so that the analyzer is now ready to start a new cycle. The lamp test switch 210 is used to turn off transistor 189 which, in turn, illuminates the digital display 104. In addition, this switch grounds line 211 which provides a series of 8's along the digital volt meter display tubes thereby indicating that all elements of the display tubes are operational.

Summarizing, the ON-OFF push button 120 provides 110 volt 60 cycle power from the AC power supply which is applied through a circuit breaker and fuse 121 to transformer 122. In addition, 110 volt AC power is supplied to the digital volt meter 103. The power supply provides +12 DC for operating the timer, audible alarm and front panel push button switch indicator lamps. The +6 volt DC supply and the −6 volt DC supply are used to provide operating potentials to operational amplifier 140 in the signal conditioning circuits. The signal from the oxygen sensor 12 is applied across calibrate potentiometer 135 and from there it goes to two places, the first being to the calibrator switch 102 which, if depressed, passes the signal directly to the digital volt meter 103. In addition, the signal from the oxygen sensor calibrate potentiometer 135 is applied to the signal conditioning circuit input where it is proportioned to the transfer function between air and blood. This modified signal then goes to the digital volt meter in the "operate" mode.

The operator depresses the analyze button 107 to thereby apply a voltage through resistor 152 to the gate of silicon control rectifier 154 which thereby is latched on. This illuminates the lamp 157 under the analyze push button switch 107. Silicon rectifier 154 also applies a signal through resistor 160 to the base of transistor 161 which output is applied to an R-C time constant circuit which, after a 90 second interval turns on transistor 171 which, in turn, turns on transistor 174. Transistor 174 provides an output signal to the gate electrode of SCR 175 which then is latched on. The SCR 175 lights the lamp 180 and also, via transistor 194 turns on the audible alarm 110. SCR 175 also supplies a signal via capacitor 182 to turn off SCR 154. SCR 175 also provides a signal which turns OFF transistor 189 (the blanking transistor which normally holds the digital volt meter which is displayed in an off state). When transistor 189 goes nonconductive, the blanking signal is removed which turns on the digital volt meter display 104. SCR 175 also turns on transistor 198 which, in its turn, turns on transistor 201. Transistor 201 provides a hold signal to digital volt meter 103 which, in effect, freezes or causes the output signal at that instant from the pO$_2$ sensor to be stored in digital volt meter 103 and displayed on the display 104 thereof.

The recycle button switch 108 resets SCR 175 and the analyzer is ready to start a new cycle. The lamp test switch 210 turns off transistor 189 which illuminates the display and applies a ground on line 211 to provide a series of 8's on the display tubes of the digital volt meter 103.

Figure 6:
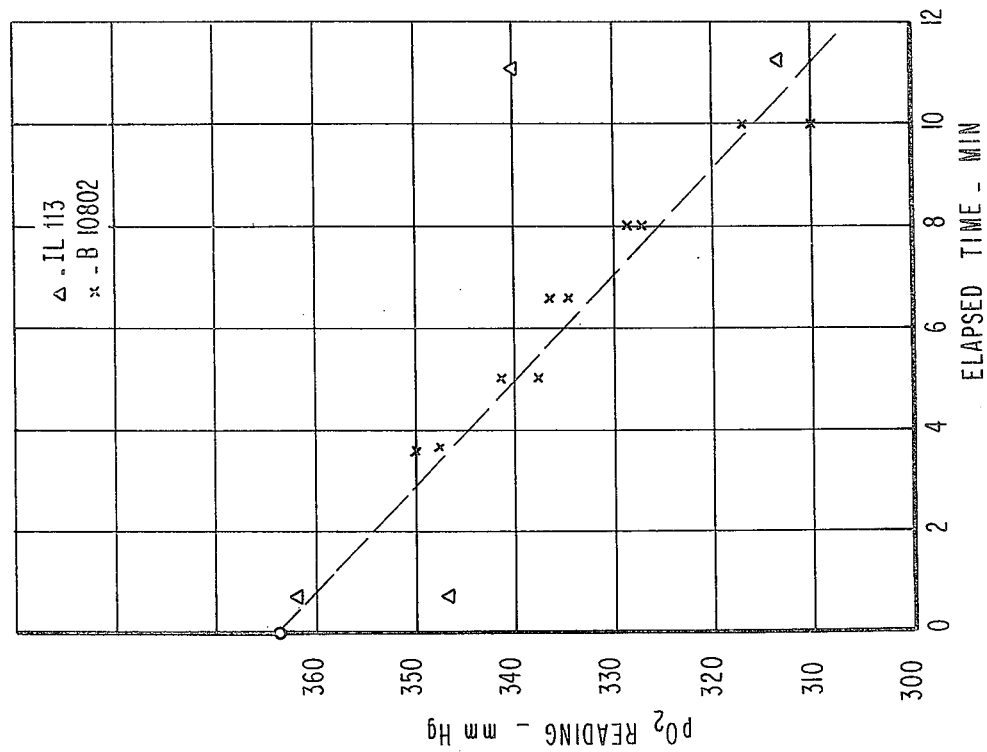
FIG. 6 is a diagram similar to FIG. 5 with the initial blood sample having a higher initial $pO_2$.
Figure 5:
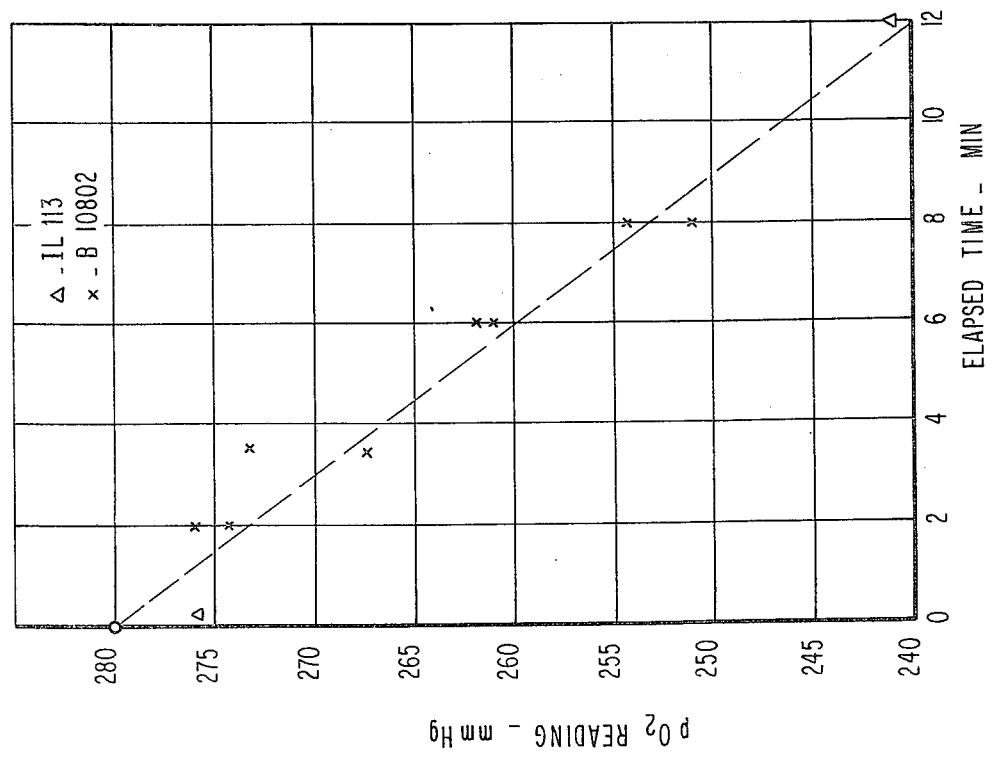
FIG. 5 is a diagram illustrating the decrease in $pO_2$ with time as measured by apparatus of the present invention and by commercially available blood gas analyzers used in laboratories.

A series of tests have been conducted to compare the results of blood oxygen analysis obtained on the above-described apparatus and on existing laboratory analyzers. The results of these tests are illustrated in FIGS. 5 and 6. Referenced blood samples were obtained through the use of a model 237 tonometer manufactured by Instrumentation Laboratories, Inc. Measurements were made to compare the results obtained from two of applicant's devices designated as BMI 802 No. 1 and BMI 802 No. 2, respectively, with two model 113 blood gas analyzers manufactured by Instrumentation Laboratories, Inc. designated IL No. 1 and IL No. 2, and which were installed in the laboratory of a large state university hospital. In order to assure accurate readings by the Model LI3 analyzers, they were calibrated with the same gas employed to produce the desired oxygen levels in the samples in the tonometer. The following table illustrates the initial readings displayed by all of the units with referenced blood samples ranging from pO$_2$ levels of 24 mm/Hg to 364 mm/Hg.

| | pO$_2$ MEASUREMENTS IN mm/Hg | | | |
|---|---|---|---|---|
| TONOMETER | BMI 802 No. 1 | BMI 802 No. 2 | IL No. 1 | IL No. 2 |
| 24 | 23 | 23 | 24 | 24 |
| 52 | 54 | 55 | 52 | 52 |
| 144 | 137 | 135 | 137 | 137 |
| 280 | 277 | 273 | 277 | 277 |
| 364 | 350 | 348 | 347 | 362 |

FIG. 5 illustrates the decrease in pO$_2$ level of an unchilled blood sample with an initial pO$_2$ measurement of 280 mm/Hg. Data from both the applicant's device and the IL Mod. 113 analyzers indicate a decrease of approximately 3.3 mm/Hg per minute or a 1.2% decrease in pO$_2$ per minute from the initial value. Comparison of the results obtained from applicant's devices and following applicant's method with those from the calibrated laboratory devices clearly demonstrate the validity of the test results obtained from applicant's blood oxygen analyzers.

FIG. 6 illustrates a slightly greater drop in the pO$_2$ of another referenced blood sample with an initial pO$_2$ of 364 mm/Hg. In this case, the rate of decrease indicated by applicant's device is approximately 5 mm/Hg per minute or 1.3% per minute from the initial value. These results, again, compare favorably with those obtained from the two IL Mod. 113 analyzers.

From the above, it is believed apparent that applicant's small, readily portable blood oxygen analyzer provides an effective tool enabling the physician to quickly and reliably determine the pO$_2$ of a patient in the patient's environment and effectively eliminates the necessity for time delays inherent in many known blood oxygen analyzers which must be installed and operated in a fixed position. Further, the relatively inexpensive apparatus and the simplicity of applicant's method which can be performed by relatively unskilled personnel makes it practical for the physician to readily obtain a determination of a patient's pO$_2$ in many circumstances where this was not previously practical.

While I have disclosed and described a preferred embodiment of my invention, I wish it understood that I do not intend to be restricted solely thereto, but that I do intend to include all embodiments thereof which would be apparent to one skilled in the art and which come within the spirit and scope of my invention.

What is claimed is:

1. A blood oxygen analyzer comprising, a galvanic $pO_2$ sensor having an oxygen permeable membrane for receiving on one side thereof a sample of blood to be analyzed and having on the other side thereof a pair of electrodes and an electrolyte solution adapted to produce a voltage proportional to oxygen permeating through said membrane, a modifying circuit for modifying the sensor signals in accordance with the transfer function of oxygen from said blood sample through said membrane, utilization means connected to said modifying circuit for utilizing the signal therefrom, and means for supplying an enable signal to said utilization means after a predetermined time interval after receipt of a blood sample on said one side of said membrane to enable said utilization means to utilize the modified signal, which at the end of said predetermined time interval is a function of the $pO_2$ of the blood sample at the time the sample was deposited on said membrane.

2. The invention as defined in claim 1 wherein said utilization means comprises a display device for displaying the oxygen content of the blood sample.

3. The invention as defined in claim 2 wherein said utilization means comprises a digital volt meter which converts an analog signal to a digital signal.

4. The invention as defined in claim 1 further comprising means for calibrating the signal from said $pO_2$ sensor with ambient air.

5. The invention as defined in claim 1 further comprising storage means for storing said signal for a selected time interval.

6. The invention as defined in claim 1 wherein said means for supplying a signal to said utilization means comprises an R-C timing circuit.

7. The invention as defined in claim 1 wherein said predetermined time interval is about 90 seconds.

8. The invention as defined in claim 1 wherein said galvanic $pO_2$ sensor comprises means for maintaining said electrolyte solution at a sub-atmospheric pressure.

9. The method of determining the $pO_2$ of blood comprising the steps of depositing a sample of the blood onto the external surface of the oxygen permeable membrane of an electrochemical oxygen sensor, maintaining said sample in a substantially unagitated condition on said membrane, said oxygen sensor being of the type in which the membrane has an external surface normally exposed to the atmosphere and wherein oxygen from solution in the blood sample permeates the membrane to produce a voltage signal from the sensor which is proportional to the amount of oxygen permeating the membrane, modifying said voltage signal in accordance with the transfer function of oxygen from said blood sample through said membrane, delaying a predetermined time after depositing said sample on said membrane, and converting said modified signal after said predetermined time to an indication of the $pO_2$ of the blood sample.

10. The method as defined in claim 9 wherein said oxygen sensor is a galvanic sensor.

11. The method as defined in claim 10 wherein said sample of blood is drawn from a patient with a hypodermic syringe and deposited directly from said syringe onto the exposed surface of said membrane.

12. The method as defined in claim 11 wherein the surface of said sample is exposed to ambient atmosphere while on said membrane.

13. In a system for determining the $pO_2$ of blood wherein a sample of the blood is placed in contact with a surface of an oxygen permeable membrane of an electrochemical oxygen sensor of the galvanic type and having a pair of electrodes positioned in an electrolyte solution on the other side of the membrane and in which oxygen from solution in the blood permeates the membrane to produce a voltage signal proportional to the amount of oxygen permeating the membrane, the improvement comprising the steps of depositing said sample directly on the surface of said membrane and maintaining said sample in a substantially undisturbed condition for a predetermined time during which oxygen from said sample permeates said membrane to produce said voltage signal, and modifying said signal after said predetermined time in accordance with the transfer function of oxygen from said blood sample through said membrane to produce an analog signal which is an indication of the $pO_2$ of the blood.

14. The method as defined in claim 13 wherein said blood sample is exposed to ambient atmosphere while on said membrane, said method further comprising the steps of converting said analog signal to a digital signal.

15. The method as defined in claim 14 wherein said sample of blood is drawn from a patient with a hypodermic syringe and deposited directly from said syringe onto the exposed surface of said membrane.

16. The method as defined in claim 13 further comprising the step of converting said analog signal to a digital signal.

* * * * *